May 22, 1934.  E. M. MARTIN ET AL  1,959,437
ELECTRIC WELDING
Filed April 27, 1932
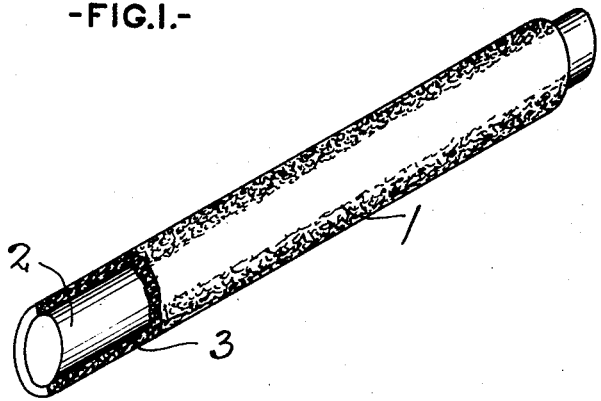
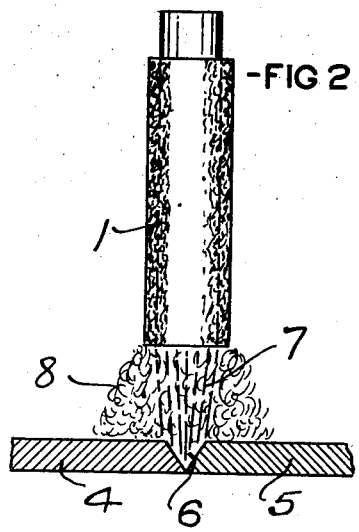
INVENTORS
Edwin M. Martin
Clifford B. Langstroth
BY
ATTORNEY Patented May 22, 1934

1,959,437

UNITED STATES PATENT OFFICE 1,959,437

ELECTRIC WELDING

Edwin M. Martin, New York, N. Y., and Clifford B. Langstroth, Plainfield, N. J.

Application April 27, 1932, Serial No. 607,711

3 Claims. (Cl. 219—8)

This invention relates to electric welding.

An object of the present invention is to provide an improved weld rod electrode for use in arc welding adapted to produce during a welding operation a gas which will occlude deleterious light rays of the arc produced at the end of the electrode so as to protect the eyes of persons in the vicinity of the arc but which gas will be sufficiently transparent to render visible the work being treated.

Other and further objects and advantages achieved by the present invention will be apparent from the following description and appended claims.

In electric arc welding with a weld rod electrode, the arc produced comprises certain light rays which are exceedingly injurious to the eyes, particularly infra-red or heat rays which have a fatiguing effect upon the eyes and the invisible ultra-violet rays which cause what is known as "sandy" or burning eyes. Such results not only entail discomfort to, and loss of time by, the operator but have frequently been known to permanently injure the operator's vision. These conditions have been commonly recognized and various shields, helmets, and goggles have been provided, which devices employ colored glass lenses which will not transmit the undesirable light rays so that the operator is protected therefrom.

The present invention provides novel means for protecting the eyes of persons in the vicinity of the arc from its injurious light rays. Heretofore the protective devices employing colored glass lenses have been secured upon, or held in close proximity to, the operator or party to be protected. In many plants where a number of welding operations are being carried on simultaneously and where a large number of persons are engaged in work near welding operations, only those persons protected by the devices as aforedescribed are shielded and persons not provided with protective devices are subjected to the said injurious effects of the light rays above mentioned, to a greater or less degree. Further, many disadvantages accompany the use of protective devices of the character aforementioned. In some instances they necessitate the operator's holding the shield manually, thus depriving him of the use otherwise of one hand. Where the glass lens is held in close proximity to the eyes, it must be necessarily properly ground and polished in order to permit clear vision. However metal globules or particles are scattered during welding operations and many of these globules cling to the glass lenses so as to obscure the vision. This has necessitated the provision of means for renewing the lenses. It has been found however that during periods just previous to the renewal of the lenses, when vision through the same is partially obscured, due to the close proximity of the lenses to the eyes, an injurious strain upon the eyes results.

The present invention provides a shield at a location in close proximity to the arc which will protect not only the operator but also others in the vicinity of the arc from the injurious light rays.

The invention is illustrated in the accompanying drawing in which Figure 1 is a perspective view of a weld rod electrode embodying the present invention, with a part of the coating of the electrode broken away; and Fig. 2 is a side view showing the electrode of Fig. 1 in operation, with base metals being welded shown in section.

Referring in detail to the drawing the weld rod electrode of the present invention, indicated generally by the numeral 1, comprises a metallic core 2 having a coating 3 formed thereon. The coating 3 comprises a composition containing a material which will produce a gas when heated by the arc, which gas will surround the arc and the adjacent part of the work being treated and will be sufficiently transparent to permit light rays to travel therethrough to an extent which will enable an operator to see the arc electrode and base metals during operation but will occlude the injurious ultra-violet and infra-red light rays, that is these injurious rays will be prevented from travelling through the gas to the eyes of the operator or persons in the vicinity of the arc. In the embodiment illustrated, the material used for this purpose is boron ester.

Other materials may also be included in the coating for various purposes. A carbohydrate material, preferably a cellulose such as pine wood in granular or shredded form, may be included. This material also produces a vapor or gas during the welding operation, that is to say, the heat of the arc effects a disintegration and vaporization thereof, and the vapor serves as a protective envelope against the deleterious influences of the atmosphere.

In United States Patent 1,930,649, issued October 17, 1933 to the inventors herein, there is described and claimed a novel coating composition which may be employed with the translucent gas producing material of the present invention.

To act as a binder for the coating, silicate of soda may be employed as one of the ingredients. The silicate of soda will also serve to quiet the arc and refine the melted material during the welding operation. Various other elements may be included in the coating for various purposes, such as calcium carbonate acting to lower the melting point at which the arc will hold and to thereby allow a lower temperature and diminish the chance of carbon or other desirable elements being lost.

A reducing agent such as silico manganese may also be included in the mixture. This agent will serve to reduce formation of oxides on the deposited metal.

In order to retard the combustion of the coating so that the crater will be at the end of the core at all times during the welding operation, as the core diminishes, a substance such as clay may be mixed with the coating material. In the preferred embodiment of the invention kaolin is employed.

The proportionate amounts of ingredients comprised in the coating of the preferred embodiment of the invention are as follows: boron ester—40 parts; cellulosic material—40 parts; sodium silicate—10 parts; calcium carbonate—3 parts; silico manganese—3 parts; and kaolin—4 parts.

These materials are mixed together and the coating is applied as a plastic mass to the core 1 by passing the core through a stuff chest of any well-known design and baking or drying the coating to the desired hardness. The core of the weld rod is of any desired metal and it is within the contemplation of the present invention to apply the mass as a cover to the rod as aforedescribed or to incorporate it in cavities formed in the sides of the rod, in a center bore formed within the core or in any other manner which proves desirable. Likewise the metallic element may, instead of being in the form of a core, be employed in granular form and the plastic mass aforedescribed incorporated therewith. The plastic mass in such case is mixed with welding metal particles in a proportion of approximately 1 to 10 respectively so that the metallic particles will be sufficiently close together to insure an unbroken electric circuit. It will be understood that, whereas certain specific ingredients and definite proportions of ingredients of the instant invention have been hereinbefore cited, this invention is not limited to the use of all the ingredients or to the specific ingredients described or to the proportions specified, but that the essential feature of the present invention is the inclusion of a material in the weld rod electrode structure which, during the welding operation, will be affected by the arc so as to produce a gas of the character and for the purpose aforedescribed. Thus, parts of the ingredients specified, and any like substances having similar properties, may be employed in various proportions as may be found desirable.

In the operation of the device as illustrated in Fig. 2, in connection with the making of a butt weld, the base metal plates 4 and 5 are placed end to end in the usual manner, the abutting ends being bevelled to provide a V-shaped gap 6. The weld rod electrode is held perpendicularly above the base metals over the gap and is connected with the source of current, the plates 4 and 5 also being connected with the source of current, in the usual manner (not shown). During the welding, an arc will be present between the end of the rod 1 and the base plates as indicated by the broken lines 7 and gas formed by the coating will surround the arc and the area of the weld as indicated by the curved lines 8 and provide a protective envelope through which ultra-violet and infra-red rays of the arc can not pass but which is sufficiently transparent to permit the operator to see the electrode and the weld area with sufficient clarity to proficiently perform the operation.

It will be apparent that by virtue of the present invention a shield is provided in close proximity to the arc so that not only is the operator protected as in the instances where the helmets, goggles, etc., of the prior art are used but all other persons in the vicinity of the welding operation are also protected.

The invention claimed and desired to be secured by Letters Patent, is:

1. A weld rod electrode for use in arc welding, comprising a metallic rod provided with a coating containing a gas producing material having the property and in sufficient relative amount to produce during a welding operation ultra-violet and infra-red light ray occluding gas sufficiently transparent to render visible the work being treated.

2. A weld rod electrode for use in arc welding, comprising a metallic rod provided with a coating containing boron ester in sufficient relative amount to produce during a welding operation ultra-violet and infra-red light ray occluding gas sufficiently transparent to render visible the work being treated.

3. A weld rod electrode for use in arc welding, comprising a metallic rod provided with a coating containing a colored gas producing material having the property and in sufficient relative amount to produce during a welding operation ultra-violet and infra-red light ray occluding colored gas sufficiently transparent to render visible the work being treated.

EDWIN M. MARTIN.
CLIFFORD B. LANGSTROTH.